United States Patent [19]

Roman

[11] 3,853,888

[45] Dec. 10, 1974

[54] PIPERIDINE INSECT CONTROL AGENTS

[75] Inventor: Steven A. Roman, Modesto, Calif.

[73] Assignee: Shell Oil Company, Houston, Tex.

[22] Filed: Feb. 9, 1973

[21] Appl. No.: 331,155

Related U.S. Application Data

[63] Continuation-in-part of Ser. No. 250,305, May 4, 1972, abandoned.

[52] U.S. Cl. .......................... 260/293.51, 424/267
[51] Int. Cl. ............................................ C07d 29/26

[58] Field of Search ............................. 260/293.51

[56] References Cited
UNITED STATES PATENTS
3,560,523  2/1971  Etienne et al. .................. 260/326.9

*Primary Examiner*—G. Thomas Todd

[57] ABSTRACT

Novel N-substituted-2-(nitromethylene)piperidines and their use for controlling unwanted insects.

2 Claims, No Drawings

PIPERIDINE INSECT CONTROL AGENTS

This application is a continuation-in-part of copending application, Ser. No. 250,305, filed May 4, 1972, now abandoned.

FIELD OF THE INVENTION

This invention relates to novel piperidines substituted at the 2-position by a nitromethylene moiety and also substituted on the nitrogen atom of the ring, and to their use for controling unwanted insects.

SUMMARY OF THE INVENTION

It has been found that certain N-substituted-2-(nitromethylene)piperidines have profound effects upon certain species of insects, apparently resulting from a mode of action quite different from the modes of action of known classes of insecticides, insect chemosterilants, and other chemicals that affect the growth and reproduction processes of insects.

The properties of these new piperidines enable their use for controlling certain species of insects. They are of particular interest as "quick knock-down agents" for controlling flying insects.

DESCRIPTION OF THE PREFERRED EMBODIMENTS

The present invention accordingly provides a novel class of insect control agents having the general formula

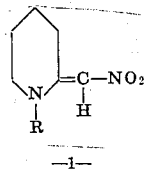

—1— wherein R is straight-chain alkyl of from 2 to 5 carbon atoms or is allyl. A preferred species is 1-ethyl-2-(nitromethylene)piperidine.

The invention is illustrated in specific cases by the working examples included hereinafter, which describe the preparation and biological testing of typical species of the compounds of the invention.

Generally speaking, the compounds of this invention can be prepared by a procedure analogous to that shown in British Pat. No. 1,236,842 for preparation of 2-(nitromethylene)-pyrrolidines, except employing the appropriate valerolactams (1-R-2-piperidones) as starting materials. In this sequence of operations, the lactam is treated with a dialkyl sulfate ($R'_2SO_4$) or a trialkyloxonium fluoroborate ($BF_4OR'_3$), then with an alkoxide to yield the corresponding lactam acetal (1-R-2,2-di(R'O-) piperidine, which is then treated with nitromethane to form the 1-R-2-(nitromethylene)piperidine. Some of the 1-R-2-piperidones are known compounds; others can be prepared by known methods, such as are summarized in Houben-Weyl, "Methods of Organic Chemistry," volume 11, part II, pages 511-587 (1958).

This procedure for preparing compounds of the invention is illustrated in the following examples of the preparation of particular species of the compounds of this invention. In these examples, "parts" means parts by weight, unless otherwise expressly indicated, with parts by weight having the same relationship to parts by volume as does the kilogram to the liter. In all cases, the identity of the product was confirmed by elemental and spectral analyses.

EXAMPLE I 1-ethyl-2-(nitromethylene)piperidine

A mixture of 12.7 parts of 1-ethyl-2-piperidone and 12.6 parts of dimethyl sulfate was stirred for 1.5 hours at 60°–65°. After cooling the mixture in an ice-water bath, a solution of 2.3 parts of sodium in 70 milliliters of methanol was added dropwise. The resultant slurry was stirred for 30 minutes at room temperature, at which time 9.2 parts of nitromethane was added dropwise. Stirring was allowed to continue for 16 hours. The solvent was removed under reduced pressure, the solid residue was quenched in water, and the aqueous mixture was extracted three times with chloroform. The combined extracts were dried (anhydrous magnesium sulfate) and the solvent was evaporated under reduced pressure. There was obtained 14.5 parts of yellow solid, m.p. 76°–93°. Recrystallization from ethanol-pentane gave 5.9 parts of 1-ethyl-2-(nitromethylene)piperidine as a pale yellow solid, m.p. 103°–105°. From the filtrate there was obtained a residue which, when recrystallized from ethanol, afforded an additional 2.1 parts of product, m.p. 103°–105°.

EXAMPLE II

Prepared by the same procedure were:
a. 1-propyl-2-(nitromethylene)piperidine, as a yellow solid, m.p. 95°–96°;
b. 1-butyl-2-(nitromethylene)piperidine, as a yellow solid, m.p. 49°–52°;
c. 1-allyl-2-(nitromethylene)piperidine, as a pale yellow solid, m.p. 75.5°–77°;
d. 1-pentyl-2-(nitromethylene)piperidine, as a pale yellow solid, m.p. 35°–37.5°.

The compounds of this invention can exist in the forms of two geometric isomers, depending upon the positioning of the substituents on the double bond of the nitromethylene/ring carbon structure, i.e., as cis-trans isomers. It is believed that the compounds of the invention are primarily in the transform, in which the two moieties containing nitrogen lie on the opposite sides of the double bond.

The compounds of this invention have been found to have profound effects upon certain species of insects. While the mode of action has not been ascertained with certainty, it clearly differs from known modes by which other chemicals act upon insects. In the cases of some species of insects the new compounds cause death; in other cases the new compounds cause immobility and/or uncoordination and/or other effects. The compounds of this invention are particularly of interest for controlling flying insects, such as house flies. With respect to these insects, the compounds act rapidly, immobilizing the insects; the compounds thus can be used as "quick knock-down agents". While alone the compounds are only moderately toxic to flying insects such as houseflies, the "knock-down" effect enables collection and destruction of the immobilized insects. Alternatively, the new compounds can be combined with compounds that are more lethal to the insects, although they may act less rapidly, or the new compounds can be combined with a conventional synergist used with pyrethrum insecticides, for it has been found that combinations of compounds of the invention with such synergists not only effect rapid knock-down of flying insects, but are highly toxic to the insects, as well. Thus, such common synergists as piperonyl butoxide, piperonyl cyclonene, n-propyl isome, sesoxane (sesamex) and like compounds containing the methylene-dioxyphenyl moiety, can be used effectively. A summary of the art relating to the use of such synergists is given at pages 215–218, "Insects," U.S.D.A. Yearbook of Agriculture, 1952. The contemplated synergists are described in more detail in U.S. Pat. No. 3,053,729. The amount of synergist to be employed in the mixture can vary considerably. Thus, less than 1% may be sufficient, or 10% or even more may be required, by weight of the insecticidal mixture. Generally, about 2% by weight of the synergist in the mixture is preferred.

The compounds of this invention are characterized by low toxicity to animals other than insects, including warm-blooded animals such as poultry and mammals, as well as cold-blooded animals such as fish, so that the new compounds are relatively safe to use, and have a minimal adverse effect upon the environment in which they are used. Further, these new compounds also tend to be unstable to sunlight, so they have short persistence, thus minimizing further any possibly adverse effect that they might have upon the environment in which they are used.

It is believed that compounds of this invention have systemic activity — that is, when applied to the roots of a plant, the chemical passes upwards into the plant and affects insects feeding upon juices of the plant, or upon the foliage of the plant. The new compounds exhibit little or no phytotoxicity and are essentially innocuous to plants at dosages which effectively control insects feeding on the plants. Compounds of the invention also are absorbed into the plant when placed upon the foliage of the plant.

The compounds of this invention can be used to control insects by means, techniques and practices which are conventional in the insecticide art, which are described, for example, in U.S. Pat. No. 3,116,201. For example, a compound can be either sprayed or otherwise applied in the form of a solution or dispersion, or can be adsorbed on an inert finely-divided solid and applied as a dust. Useful solutions for application by spraying, brushing, dipping and the like, can be prepared by using as the solvent any of the well known inert horticultural carriers, including neutral hydrocarbons, such as kerosene and other light mineral oil distillates of intermediate viscosity and volatility.

Adjuvants such as spreading or wetting agents can also be included in the solution. These solutions may be employed as such, or more preferably, they can be dispersed or emulsified in water and the resulting aqueous dispersion or emulsion applied as a spray. Solid carrier materials which can be employed include talc, bentonite, lime, gypsum, and similar inert solid diluents. To control flying insects, the compounds of the present invention can be employed conveniently as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations as little as about 0.001 to 0.5% based upon the total weight of the composition, even though under some circumstances as little as about 0.0001% or as much as about 2% or even more of the compound can be employed with good results from an insecticidal standpoint. Concentrates suitable for sale for dilution in the field and/or for ultra-low volume spray applications may contain as much as 25–50% by weight or even more of the active compound.

When employed as an insect control agent the compound of this invention can be used either as the sole toxic ingredient of the control composition or it can be employed in conjunction with other, insecticidally active, materials. Representative insecticides of this class include the naturally occurring insecticides such as pyrethrum, rotenone, sabadilla, and the like, as well as the various synthetic insecticides including DDVP, benzene hexachloride, thiodiphenylamine, cyanides, tetraethyl pyrophosphate, diethyl p-nitrophenyl thiophosphate, dimethyl 2,2-dichlorovinyl phosphate, 1,2-dibromo-2,2-dichlorethyl dimethyl phosphate, azobenzene, and the various compounds or arsenic, lead and/or fluorine.

The effectiveness of compounds of this invention for controlling insects is illustrated in the following Examples.

EXAMPLE III

Insecticidal activity was determined by means of appropriate tests which established the $LC_{50}$ dosage (dosage in grams of test compound per 100 milliliters of solvent required in the solution or suspension used as a spray to kill 50% of the test insects) of compounds of the invention with respect to several species of insects. The liquid carrier used to prepare the solution or suspension was composed of 2 parts by volume of acetone, 8 parts by volume of water and 0.05 parts by weight of Atlox, a wetting agent. The results are summarized in Table I.

TABLE I $LC_{50}$ Dosage of Test Compound for Indicated Insect (% actual toxicant)

| Compound of Example No. | Housefly | Pea Aphid | Rice Weevil | Corn Earworm | 2-spotted spider mite | Mosquito larva |
|---|---|---|---|---|---|---|
| 1 | 0.039 | .0075 | >0.1 | 0.083 | >0.2 | 5 ppm* |
| IIa | 0.047 | .0067 | >0.1 | 0.24 | >0.2 | 8 ppm* |
| IIb | 0.06 | .005 | >0.1 | 0.20 | >0.2 | 7 ppm* |
| IIc | 0.123 | .0042 | >0.1 | 0.18 | >0.2 | 5 ppm* |
| IId | >0.5 | .0034 | >0.1 | >0.20 | >0.2 | >10 ppm |

* approximate

EXAMPLE IV

Quick knock-down potential was determined by observation of the housefly during the primary screening reported in Table I. A test compound was considered to be an effective quick knock-down agent if it immobilized 80% of the flies in 30 minutes, at a concentration of 0.5% w/v in the spray used. Referring to the compounds of Table I, Compounds I, IIa, IIb, IIc and IId all were found to qualify.

EXAMPLE V

Those compounds that passed the screen in Example IV were tested at a dosage of 0.1% w/v in the spray. Any such compound that immobilized 50% of the flies in 30 minutes was further tested, using the same procedure, to determine its $KT_{50}$ value (minutes required to immobilize 50% of the flies at a spray dosage of 0.1% w/v). $KT_{50}$ values found are summarized in Table II.

TABLE II

| Compound | $KT_{50}$ (minutes) |
|---|---|
| I | 0.74 |
| IIa | 1.2 |
| IIb | 1.7 |
| IIc | 1.2 |
| IId | 3.2 |

EXAMPLE VI

Compounds which were found to have a $KT_{50}$ value equal to or less than 3 minutes were tested as aerosol formulation in a Peet-Grady chamber. Compounds I IIa and IIb were also found to be quick knock-down agents in these tests.

EXAMPLE VII

The effect of synergists upon the activity of compounds of the invention was determined, the housefly being the test insect. The procedure used was that described in Example III except that the flies were sprayed with a 1% solution of synergist (sesamex) at the time they were sprayed with the solution (or suspension) of test compound. Results were reported as the $LC_{50}$ dosage. The results are summarized in Table III.

TABLE III

| | $LC_{50}$ dosage | | |
|---|---|---|---|
| Compound of Example No. | Without Synergist | With Synergist | Increase in toxicity due to synergist* (%) |
| I | 0.039 | 0.00098 | 3980 |
| IIa | 0.047 | 0.00144 | 3264 |
| IIb | 0.06 | 0.00167 | 3592 |
| IIc | 0.123 | 0.00157 | 7834 |
| IId | >0.5 | 0.0048 | >10417 |

What is claimed is:

1. A compound of the formula

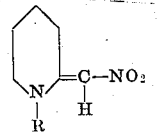

wherein R is straight-chain alkyl of 2 to 5 carbon atoms or is allyl.

2. A compound according to claim 1 wherein R is ethyl.

* * * * *